(12) United States Patent
Unno et al.

(10) Patent No.: US 6,315,458 B1
(45) Date of Patent: Nov. 13, 2001

(54) ROLLER BEARING

(75) Inventors: Tetsuo Unno; Yoshio Shoda, both of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/336,782

(22) Filed: Jun. 21, 1999

(30) Foreign Application Priority Data

Jun. 19, 1998 (JP) .................................................. 10-173429

(51) Int. Cl.[7] .............................. F16C 33/36; F16C 33/58; F16C 19/22
(52) U.S. Cl. ........................... 384/565; 384/568; 384/569
(58) Field of Search .................................... 384/450, 568, 384/565, 571, 569

(56) References Cited

U.S. PATENT DOCUMENTS

| | | |
|---|---|---|
| 1,646,947 | 10/1927 | Armstrong . |
| 1,910,184 * | 5/1933 | Scribner ................................ 384/571 |
| 1,915,585 * | 6/1933 | Wingquist ............................. 384/571 |
| 1,967,650 * | 7/1934 | Ahmansson .......................... 384/571 |
| 2,008,336 * | 7/1935 | Parmgren ............................. 384/571 |
| 2,082,390 * | 6/1937 | Gibbons ............................... 384/571 |
| 2,418,322 * | 4/1947 | Spicacci ............................... 384/571 |
| 2,595,121 | 4/1952 | Bonte .................................... 308/214 |
| 3,910,656 | 10/1975 | Price et al. ........................... 308/194 |
| 4,557,613 * | 12/1985 | Tallian et al. ........................ 384/568 |
| 4,705,411 | 11/1987 | Kellstrom ............................. 384/450 |
| 4,802,775 * | 2/1989 | Takata .................................. 384/450 |
| 4,828,404 | 5/1989 | Takata .................................. 384/450 |
| 4,929,098 | 5/1990 | Takata et al. ........................ 384/450 |
| 5,441,351 * | 8/1995 | Grunze ................................. 384/568 |
| 5,752,775 * | 5/1998 | Tsutsui et al. ....................... 384/568 |
| 6,227,711 * | 5/2001 | Kellstrom et al. ................... 384/450 |

FOREIGN PATENT DOCUMENTS

| | | | |
|---|---|---|---|
| 40 16 492 A1 | 11/1990 | (DE) | ............................... F16C/19/26 |
| 29 35 023 | 3/1980 | (DE) | ............................... F16C/19/34 |
| 2 154 836 | 5/1972 | (DE) | ............................... F16C/19/36 |
| 24 53 313 | 5/1975 | (DE) | ............................... F16C/23/08 |
| 0 649 990 A1 | 4/1995 | (EP) | ............................... F16C/23/08 |
| WO 96/17179 | 6/1996 | (WO) | ............................... F16C/33/36 |

* cited by examiner

*Primary Examiner*—Charles A Marmor
*Assistant Examiner*—Ankur Parekh
(74) *Attorney, Agent, or Firm*—Sughrue, Mion, Zinn, Macpeak & Seas, PLLC

(57) ABSTRACT

The roller bearing 10 comprises a plurality of substantially cylindrical-shaped rollers 15 which are respectively interposed between a concave shaped race surface 12 formed on an outer race 11 and a concave-shaped race surfaces 14 formed on an inner race 13. Each of the rollers 15 is structured such that the central portion of the rolling surface thereof is formed by a first convex-shaped bus 17 which corresponds to the concave-shaped race surfaces 12 and 14, while the two end portions of the rolling surface thereof are respectively formed by second buses 16 which have a radius of curvature smaller than the radius of curvature of the first bus 17.

4 Claims, 14 Drawing Sheets

ROLLER BEARING

BACKGROUND OF THE INVENTION

The present invention relates to a roller bearing and, in particular, to a roller bearing including a plurality of rolling members each of which is formed in a substantially conical shape, a substantially cylindrical shape, or a similar shape.

In a roller bearing including a plurality of substantially cylindrical-shaped or substantially conical-shaped rolling members (which are hereinafter referred to as rollers), if there occurs an axis shift, that is, if the axes of outer and inner races intersect each other, then, in a contact portion between the race surface (so called as an outer racetrack) of the outer race and the rollers and/or a contact portion between the race surface (so called as an inner racetrack) of the inner race and the rollers, on one side of the position where the roller end portions are contacted with the race surfaces of the inner and/or outer races, there may occur locally an increase in the contact pressure (which is hereinafter referred to as edge stress), which raises a fear that the roller bearing may be damaged in the early stage.

Therefore, when mounting the roller bearing onto various devices, it is necessary to make the axes of the outer and inner races coincide with each other with high accuracy, but, in fact, there is a possibility that the axes of the outer and inner races can be shifted/deviated from each other if the rotary shaft of the roller bearing is flexed due to a large axial load.

In order to avoid the above problem, conventionally, there is used a roller bearing in which a crowning operation such as a full crowning operation or a partial crowning operation is performed on the surfaces of the inner and outer races and/or the peripheral surfaces (which are hereinafter referred to as rolling surfaces) of the respective rollers (that is, a conventional roller bearing).

Here, the crowning operation means an operation which works the whole or given areas of buses forming the surfaces of the inner and outer races or the whole or given areas of buses forming the rolling surfaces of the rollers into convex-shaped curved surfaces.

By the way, in the above-mentioned conventional roller bearing, in a large axis shift angle (in which the axes of the outer and inner races can be shifted/deviated from each other by a relatively large angle), in order to prevent the edge stress from occurring between the race surfaces and the rolling surfaces, the radius of curvature of the portion to be crowned must be set small.

However, if the radius of curvature of the portion to be crowned is set small, when the axis shift angle is small (in which the axes of the outer and inner races can be shifted/deviated from each other by a relatively small angle), or when no axis shift occurs, the surface pressures in the central portions of the contact portions between the respective race surfaces and rollers are inconveniently high when compared with a case in which no crowning operation is performed or a case in which the radius of curvature of the portion to be crowned is set large.

SUMMARY OF THE INVENTION

The present invention aims at eliminating the above drawbacks found in the conventional roller bearing. Accordingly, it is an object of the invention to provide a roller bearing which can prevent occurrence of an edge stress in a large axis shift angle produced between the outer and inner races, and also, even when the axis shift angle between the outer and inner races is small, can control an increase in the surface pressures in the central portions of the contact portions between the surfaces of the outer and inner races and the rolling surfaces of the rollers.

The above-mentioned object can be achieved by a roller bearing according to the present invention comprising an outer race including an outer race surface which is formed on the inner peripheral surface thereof which is defined by rotating an outer race surface defining bus about an axis thereof, an inner race including an inner race surface which is formed on the outer peripheral surface thereof and is defined by rotating an inner race surface defining bus about the axis, and a plurality of rolling members respectively interposed between the outer and inner race surfaces in which an outer peripheral surface of each of the rolling members is defined by rotating a rolling surface defining bus. At least one of the outer race surface defining bus, the inner race surface defining bus and the rolling surface defining bus comprises a first radius of curvature. Each of the others of the outer race surface defining bus, the inner race surface defining bus and the rolling surface defining bus comprises, a first bus having a second radius of curvature which is different from the first radius of curvature and substantially disposed at a center in an axial direction of the roller bearing and second buses disposed both sides of the first bus, each of the second buses having a third radius of curvature which is different from the first radius of curvature and is also different from the second radius of curvature.

In the above-mentioned construction according to the present invention, it is preferable that each of the outer race surface defining bus and the inner race surface defining bus has the first radius of curvature, and the rolling surface defining bus comprises the first bus and the second buses.

Further, in the above-mentioned construction according to the present invention, it is also preferable that each of the outer race surface defining bus and the inner race surface defining bus comprises the first bus and the second buses, and the rolling surface defining bus has the first radius of curvature.

Moreover, in the above-mentioned roller bearing, it is preferable that each of the outer race surface and the inner race surface is a concave shape, and also the first radius is larger than the second radius, and the second radius is larger than the third radius.

In addition, in the above-mentioned roller bearing, it is advantageous that each of the outer race surface and the inner race surface is a convex shape, and also the first radius is smaller than the second radius, and the second radius is smaller than the third radius.

Further in attaining the above object, according to one aspect of the invention, there is provided a roller bearing comprising an outer race including a concave-shaped race surface formed on the inner peripheral surface thereof, an inner race including a concave-shaped race surface formed on the outer peripheral surface thereof, and a plurality of substantially cylindrical-shaped rolling members respectively interposed between the concave-shaped race surfaces of the outer and inner races, the outer peripheral surface of each of the rolling members being formed by a convex-shaped bus, wherein each of central portions in one of the concave-shaped race surfaces of the outer and inner races and the outer peripheral surfaces of the rolling members is formed by a first bus having a given radius of curvature, and two end portions respectively adjoining the central portion are respectively formed by second buses each having a radius of curvature which causes the two end portions to be separate from the other of the concave-shaped race surfaces of the outer and inner races and the outer peripheral surfaces of the rolling members.

Also, according to another aspect of the invention, there is provided a roller bearing comprising an outer race including a convex-shaped race surface formed on the inner peripheral surface thereof, an inner race including a convex-shaped race surface formed on the outer peripheral surface thereof, and a plurality of substantially cylindrical-shaped rolling members respectively interposed between the convex-shaped race surfaces of the outer and inner races, the outer peripheral surface of each of the rolling members being formed by a concave-shaped bus, wherein each of central portions in one of the convex-shaped race surfaces of the outer and inner races and the outer peripheral surfaces of the rolling members is formed by a first bus having a given radius of curvature, and two end portions respectively adjoining the central portion are respectively formed by second buses each having a radius of curvature which causes the two end portions to be separate from the other of the convex-shaped race surfaces of the outer and inner races and the outer peripheral surfaces of the rolling members.

Here, in the roller bearing according to the invention, the concave-shaped race surfaces of the outer and inner races as well as the outer peripheral surfaces of the rolling members (or rollers) may be formed by the first and second buses which continue with each other and have different radii of curvature.

In more particular, to form the rolling surface of each roller using the first and second buses, the central portion of the rolling surface of the roller may be formed by the first convex-shaped bus which corresponds to the buses of the respective concave-shaped race surfaces and, at the same time, the two end portions of the rolling surface of the roller may be respectively formed by the second convex-shaped buses each having a radius of curvature smaller than that of the first bus.

On the other hand, to form each of the respective concave-shaped race surfaces of the outer and inner races, the central portion of each of the respective concave-shaped race surfaces may be formed by the first concave-shaped bus which corresponds to the bus of the rolling surface of the roller and, at the same time, the two end surface sides of each concave-shaped race surface may be respectively formed by the second concave-shaped buses each having a larger radius of curvature than the first bus.

In addition, in the above-mentioned roller bearing according to the present invention, it is advantageous that a center of curvature of the concave-shaped bus defined by the concave-shaped race surface of the outer race is positioned at a position further than the axis of the roller bearing. In this case, the edge load can be remarkably and effectively suppressed.

Further, in the above-mentioned roller bearing according to the present invention, it is advantageous that a center of curvature of the convex-shaped bus defined by the convex-shaped race surface of the inner race is positioned at a position further than the axis of the roller bearing. In this case, the edge load can be remarkably and effectively suppressed.

Also, in the above-mentioned roller bearing according to the present invention, the convex-shaped race surfaces of the outer and inner races as well as the outer peripheral surfaces of the rolling members (or rollers) may be formed by the first and second buses which continue with each other and have different radii of curvature.

In more particular, to form the rolling surface of each roller using the first and second buses, the central portion of the rolling surface of the roller may be formed by the first concave-shaped bus which corresponds to the buses of the respective convex-shaped race surfaces and, at the same time, the two end portions of the rolling surface of the roller may be respectively formed by the second concave-shaped buses each having a radius of curvature larger than that of the first bus.

On the other hand, to form each of the respective convex-shaped race surfaces of the outer and inner races, the central portion of each of the respective convex-shaped race surfaces may be formed by the first convex-shaped bus which corresponds to the bus of the rolling surface of the roller and, at the same time, the two end surface sides of each convex-shaped race surface may be respectively formed by the second convex-shaped buses each having a larger radius of curvature than the first bus.

In addition, in these cases, in order that the boundary line between the first and second buses cannot provide a ridge or a groove, the first and second buses may be so formed as to continue with each other smoothly, or a chamfering operation may be performed along the boundary line between the first and second buses.

By the way, the above-mentioned concave-shaped race surfaces, convex-shaped race surfaces, and rolling members are not limited to those which are formed by the first and second buses; but, they can also be formed by two or more kinds of buses.

In the conventional roller bearing, contact between the crowned race surfaces and the rolling surfaces of the rollers is carried out in the form of mutual contact between the convex-shaped buses by which the race surfaces and roller rolling surfaces are formed. On the other hand, in the above-mentioned structures according to the invention, the race surfaces formed by convex-shaped buses are to be contacted with the roller rolling surfaces formed by buses each having a corresponding shape, that is, the roller rolling surfaces formed by the concave-shaped buses. Thanks to this, even when the axis shift angle between the outer and inner races is small, or even when no axis shift is present between the outer and inner races, there is no fear that the contact surface pressure between the respective race surfaces and the rolling surfaces of the rollers can be increased up to a high pressure.

Also, in the present two roller bearings, since there are produced relatively large clearances respectively between the race surfaces and the rolling surfaces of the rollers, even if there occurs a relatively large axis shift between the outer and inner races, there is no possibility that an edge load or the like can be generated.

In addition, in the case where a bus configuration of each of the aforementioned rolling surface and race surfaces are formed by a plurality of buses having different radii of curvatures, it is possible to connect them more smoothly at its boundary portions, to thereby suppress an increase in the surface pressures between the respective race surfaces and the respective rolling members.

Therefore, in these roller bearings, when compared with the conventional roller bearing, a large axis shift angle to be produced between the outer and inner races can be coped with properly and also, even when the axis shift angle between the outer and inner races is small, an increase in the surface pressures between the respective race surfaces and the respective rolling members can be controlled, whereby the above-mentioned object of the invention can be achieved.

By the way, in these roller bearings, to control the rise in the surface pressure in the boundary between the first and second buses having different radii of curvature, there can be employed a structure in which the first and second buses have a common tangent in the boundary between them, or a structure in which there is formed a third bus in such a manner that it extends astride the first and second buses.

DETAILED DESCRIPTION OF THE PREFERRED EMBODIMENTS

Figure 1:
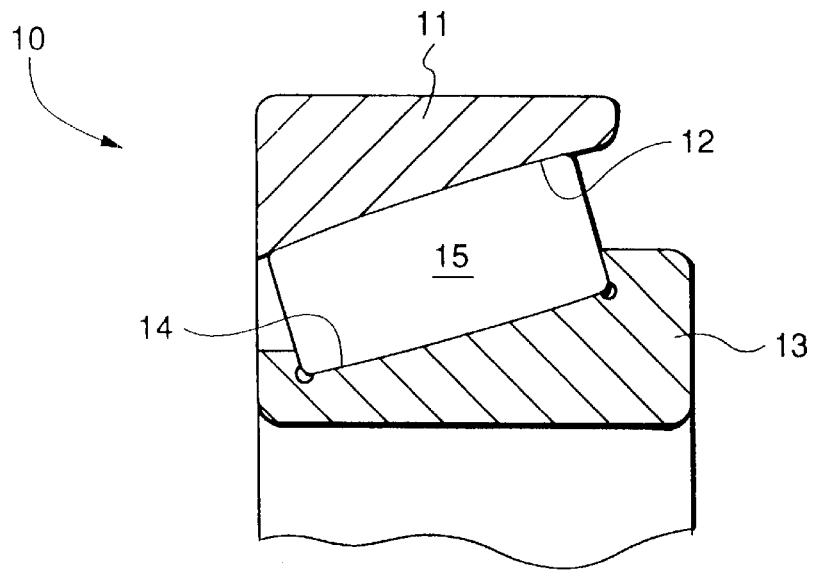
FIG. 1 is a section view of the main portions of a first embodiment of a roller bearing according to the invention.
Figure 1:
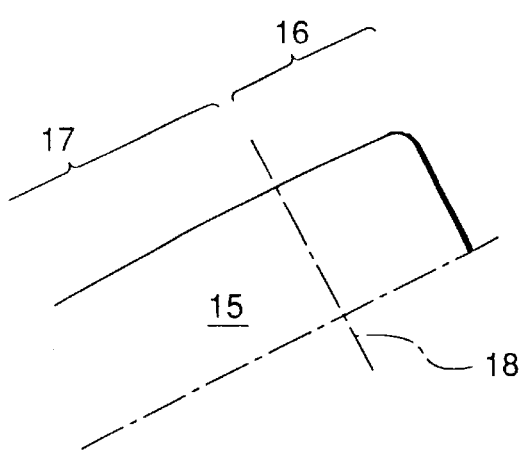
Figure 1:
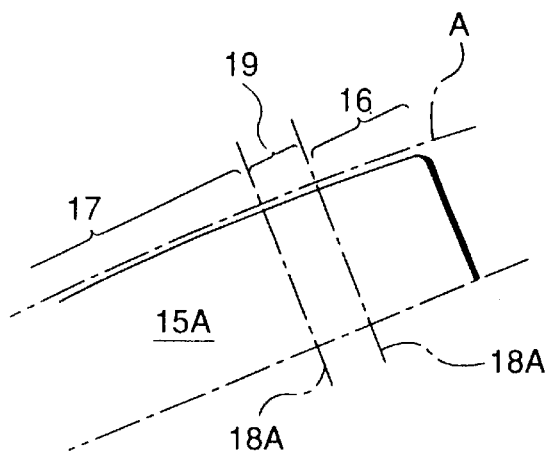

Now, description will be given below in detail of the preferred embodiments of a roller bearing according to the invention with reference to the accompanying drawings. That is, FIGS. 1 to 10 are respectively section views of the main portions of first to tenth embodiments of a roller bearing according to the invention.

As shown in FIG. 1(A), a roller bearing 10, which is a first embodiment of the invention, comprises a plurality of substantially conical-shaped rollers 15 which are respectively interposed between a concave-shaped race surface 12 formed on an outer race 11 and a concave-shaped race surface 14 formed on an inner race 13.

As shown in FIG. 1(B), each roller 15 is structured such that the central portion of the rolling surface thereof is formed by a first bus 17, whereas the portions of the rolling surface thereof, which are respectively situated on the large-diameter side (in FIG. 1(B), on the right side) and on the small-diameter side (in FIG. 1(B), on the left side which is not shown), are respectively formed by second buses 16. (In other words, as shown in FIG. 1(B), each roller 15 is structured in such a manner that the central portion of the rolling surface is defined by rotating a first bus 17 about the axis of the roller 15, and the right and left side portions of the rolling surface are respectively defined by rotating second buses 16 about the axis of the roller 15.) Here, the radius of curvature of the first bus 17 is so set so as to substantially correspond to the buses of the concave-shaped race surfaces 12 and 14, that is, it is set very slightly smaller than the radii of curvature of the buses of the concave-shaped race surfaces 12 and 14, while the radius of curvature of the second bus 16 is set slightly smaller than the radius of curvature of the first bus 17.

And, since the first and second buses 17 and 16 are formed such that they have a common tangent line in the boundary area thereof, there is eliminated a fear that the surface pressure can increase in the boundary portion 18 between first and second buses 17 and 16.

By the way, in order to prevent an increase in the surface pressure in a specific portion in the roller bearing 10, as shown in FIG. 1(C), there may also be employed a roller 15A in which the portion thereof existing between the first and second buses 17 and 16 is formed by a third bus 19.

With use of this roller 15A, the surface pressure in the boundary line 18A between the first and third buses 17 and 19, or the surface pressure in the boundary portion 18B between the second and third buses 16 and 19 can be reduced when compared with the surface pressure of the boundary portion 18 in the roller 15.

In the above-structured roller bearing 10, since the first bus 17 in the roller 15 is formed in a convex shape and the radius of curvature thereof is so set as to correspond to the buses of the concave-shaped race surfaces 12 and 14, that is, it is set very slightly smaller than the radii of curvature of the buses of the concave-shaped race surfaces 12 and 14, even when the axis shift angle between the outer race 11 and inner race 13 is small, or even when no axis shift occurs, the convex-shaped rolling surfaces of the rollers 15 can be line contacted with the concave-shaped race surfaces 12 and 14 over a sufficient length. Accordingly, there is eliminated a fear that the surface pressures between the race surfaces 12 and 14 and the respective rollers 15 are increased.

And, in the roller bearing 10, because the radius of curvature of the second bus 16 is set smaller than the radius of curvature of the first bus 17 in each roller 15, the roller baring 10 is capable of coping with a large axis shift angle produced between the outer and inner races.

Therefore, when compared with the conventional roller bearing, the present roller bearing 10 is capable of coping with a large axis shift angle produced between the outer and inner races, and also, even when the axis shift angle between the outer race 11 and inner race 13 is small, can control an increase in the surface pressures between the concave-shaped race surfaces 12, 14 and the respective rolling members 15.

In addition to this, in this embodiment, a center of curvature of the first bus 17 is positioned at a position further than the axis of the roller bearing, so that the edge load can be remarkably and effectively suppressed.

Figure 2:
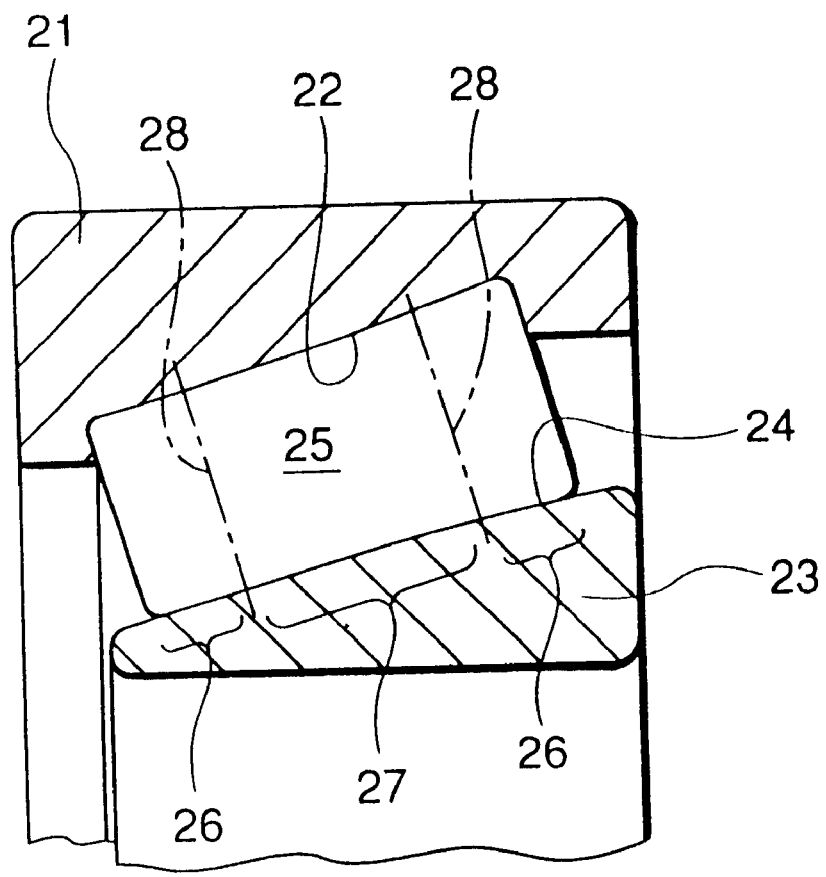
FIG. 2 is a section view of the main portions of a second embodiment of a roller bearing according to the invention.

As shown in FIG. 2, a roller bearing 20, which is a second embodiment of the invention, comprises a plurality of substantially conical-shaped rollers 25 which are respectively interposed between a convex-shaped race surface 22 formed on an outer race 21 and a convex-shaped race surface 24 formed on an inner race 23.

Each of the rollers 25 is structured such that the central portion of the rolling surface thereof is formed by a first concave-shaped bus 27, whereas the two end portions of the rolling surface thereof are formed by second concave-shaped buses 26 and 26 respectively.

Here, the radius of curvature of the first bus 27 is so set as to correspond to the buses of the convex-shaped race surfaces 22 and 24, that is, it is set very slightly larger than the radii of curvature of the buses of the convex-shaped race surfaces 22 and 24, while the radii of curvature of the second buses 26 are set slightly larger than the radius of curvature of the first bus 27. And, the roller 25 is also structured such that the first bus 27 and second buses 26, 26 have a common tangent line in the boundary portion 28 between them.

With use of the roller bearing 20 as well, there can be obtained a similar effect to the previously described roller bearing 10.

Figure 3:
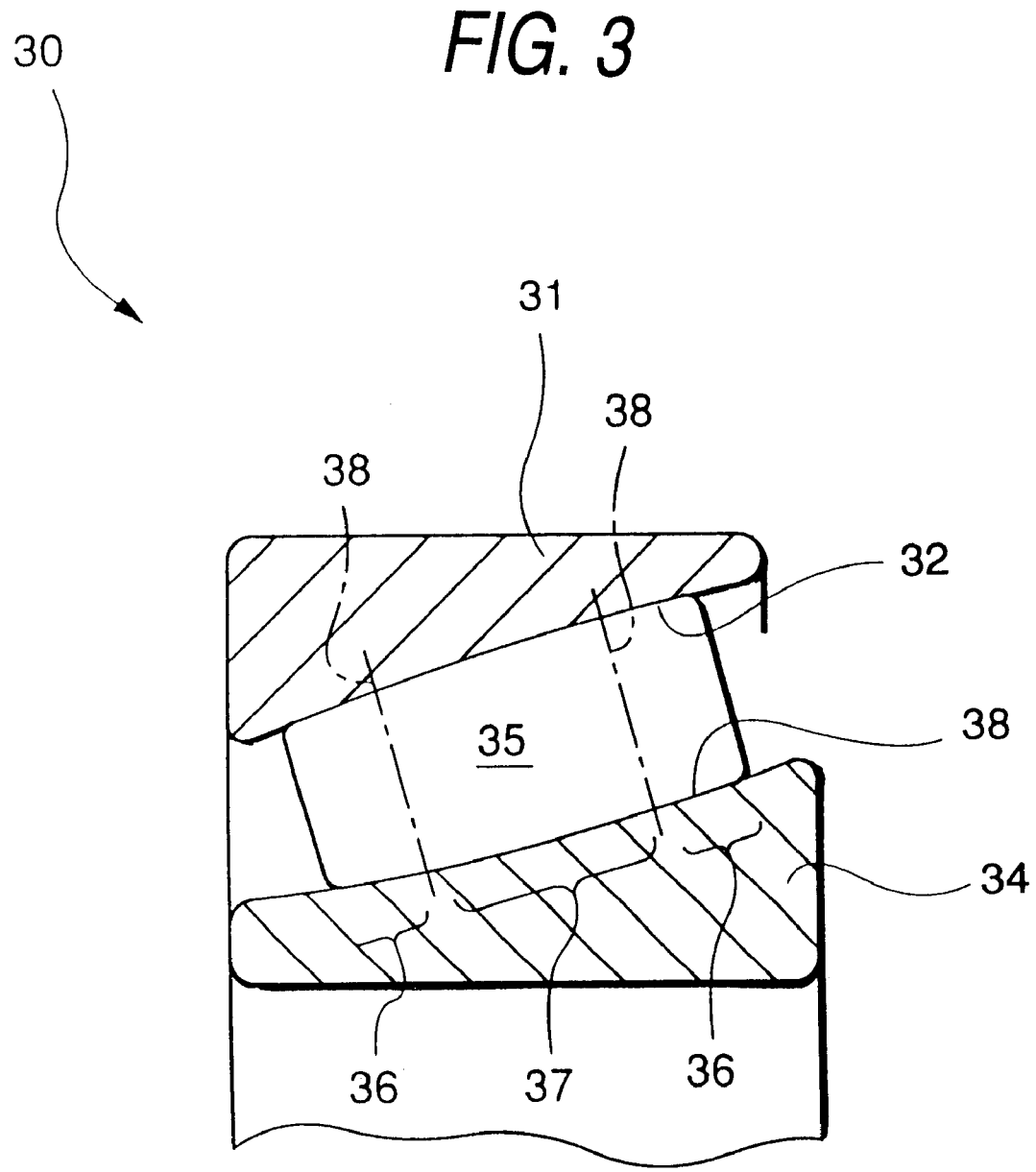
FIG. 3 is a section view of the main portions of a third embodiment of a roller bearing according to the invention.

As shown in FIG. 3, a roller bearing 30, which is a third embodiment of the invention, comprises a plurality of substantially conical-shaped rollers 35 which are respectively interposed between the concave-shaped race surface 32 of an outer race 31 and the concave-shaped race surface 34 of an inner race 33.

Each of the rollers 35 is structured such that the central portion of the rolling surface thereof is formed by a first convex-shaped bus 37, while the two end portions of the rolling surface thereof are respectively formed by second convex-shaped buses 36 and 36. The radius of curvature of the first bus 37 is so set as to correspond to the radii of curvature of the buses of the concave-shaped race surfaces 32 and 34, that is, it is set very slightly smaller than the radii of curvature of the buses of the concave-shaped race surfaces 32 and 34, whereas the radii of curvature of the second buses 36 and 36 are set slightly smaller than the radius of curvature of the first bus 37. And, the roller 35 is also structured such that the first bus 37 and second buses 36, 36, have a common tangent line in the boundary portion 38 between them.

The present roller bearing 30, when compared with the conventional roller bearing, not only can cope with a large axis shift angle to be produced between the outer and inner races 31 and 33, but also, even when the axis shift angle between the outer and inner races 31 and 33 is small, can control an increase in the surface pressure between the concave-shaped race surfaces 32, 34 and the respective rolling members 35.

Figure 4:
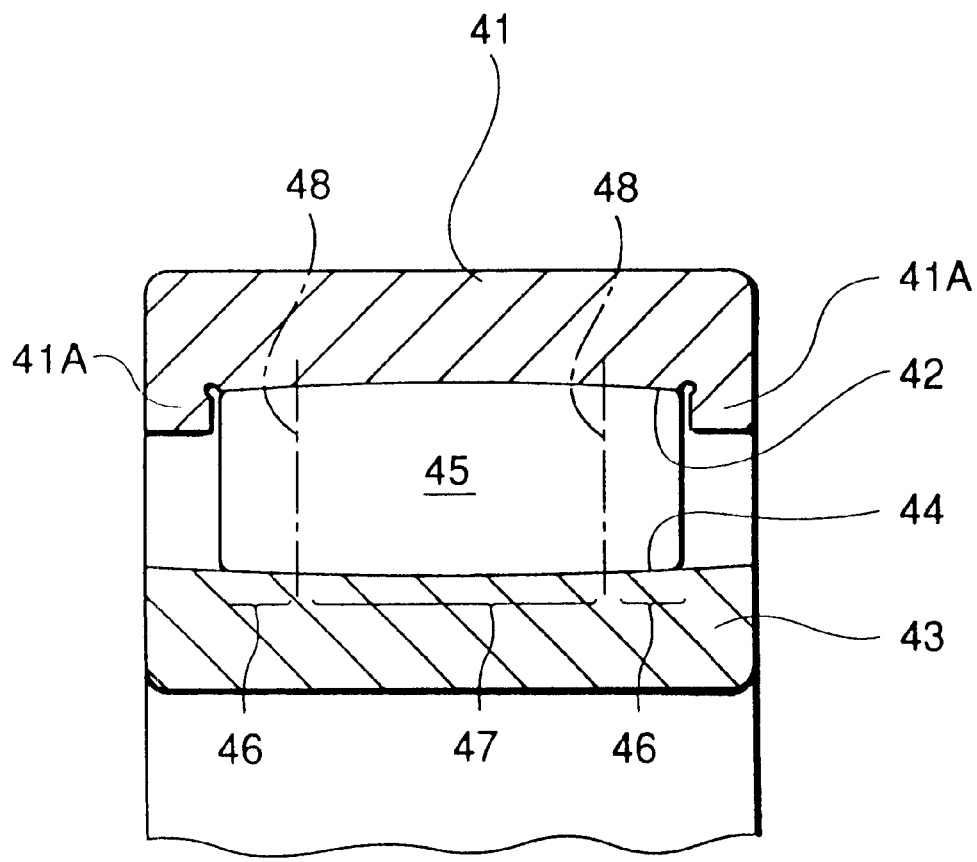
FIG. 4 is a section view of the main portions of a fourth embodiment of a roller bearing according to the invention.

As shown in FIG. 4, a roller bearing 40, which is a fourth embodiment of the invention, comprises a plurality of substantially barrel-shaped rollers 45 which are respectively interposed between a concave-shaped race surface 42, which is formed between a pair of ribs 41A and 41A respectively disposed in an outer race 41, and a concave-shaped race surface 44 formed on an inner race 43. Each of the rollers 45 is structured such that the central portion of the rolling surface thereof is formed by a first convex-shaped bus 47, while the two end portions of the rolling surface thereof are respectively formed by second convex-shaped buses 46 and 46.

Referring in more particular to the structure of the roller 45, the radius of curvature of the first bus 47 is so set as to correspond to the radii of curvature of the buses of the concave-shaped race surfaces 42 and 44, that is, it is set very slightly smaller than the radii of curvature of the buses of the concave-shaped race surfaces 42 and 44, and the radii of curvature of the second buses 46 and 46 are set slightly smaller than the radius of curvature of the first bus 47; and, the first bus 47 and the second buses 46, 46 have a common tangent in their respective boundary portions 48.

With use of the present roller bearing 40 as well, there can be obtained a desired effect.

Figure 5:
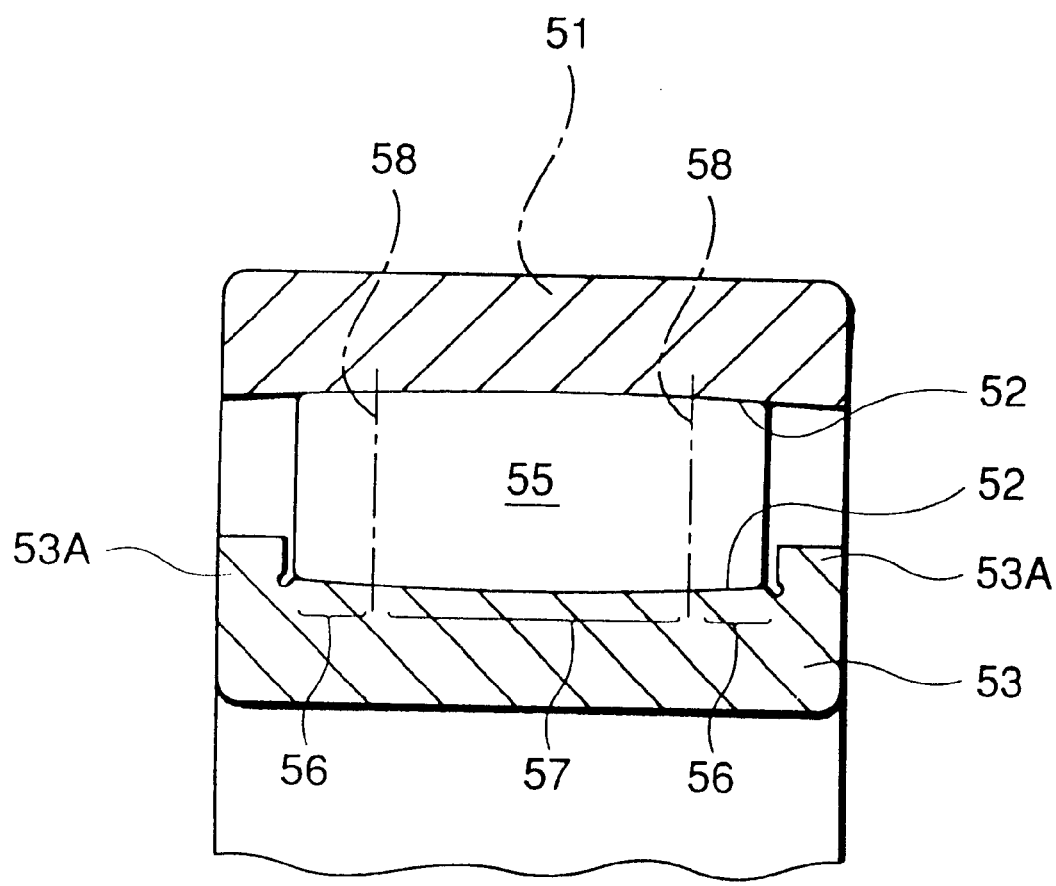
FIG. 5 is a section view of the main portions of a fifth embodiment of a roller bearing according to the invention.

As shown in FIG. 5, a roller bearing 50, which is a fifth embodiment of the invention, comprises a plurality of barrel-shaped rollers 55 which are respectively interposed between a concave-shaped race surface 52 of an outer race 51 and a concave-shaped race surface 54, which is interposed between a pair of ribs 53A and 53A respectively disposed on an inner race 53. Each of the rollers 55 is structured such that the central portion of the rolling surface thereof is formed by a first convex-shaped bus 57, while the two end portions of the rolling surface thereof are respectively formed by second convex-shaped buses 56 and 56.

Referring in more particular to the structure of the roller 55, the radius of curvature of the first bus 57 is so set as to correspond to the radii of curvature of the buses of the concave-shaped race surfaces 52 and 54, that is, the former is set very slightly smaller than the latter, and the radii of curvature of the second buses 56 and 56 are respectively set slightly smaller than the radius of curvature of the first bus 57; and, the first bus 57 and the second buses 56, 56 have a common tangent in their respective boundary portions 58.

According to the present roller bearing 50 as well, there can be obtained a desired effect.

Figure 6:
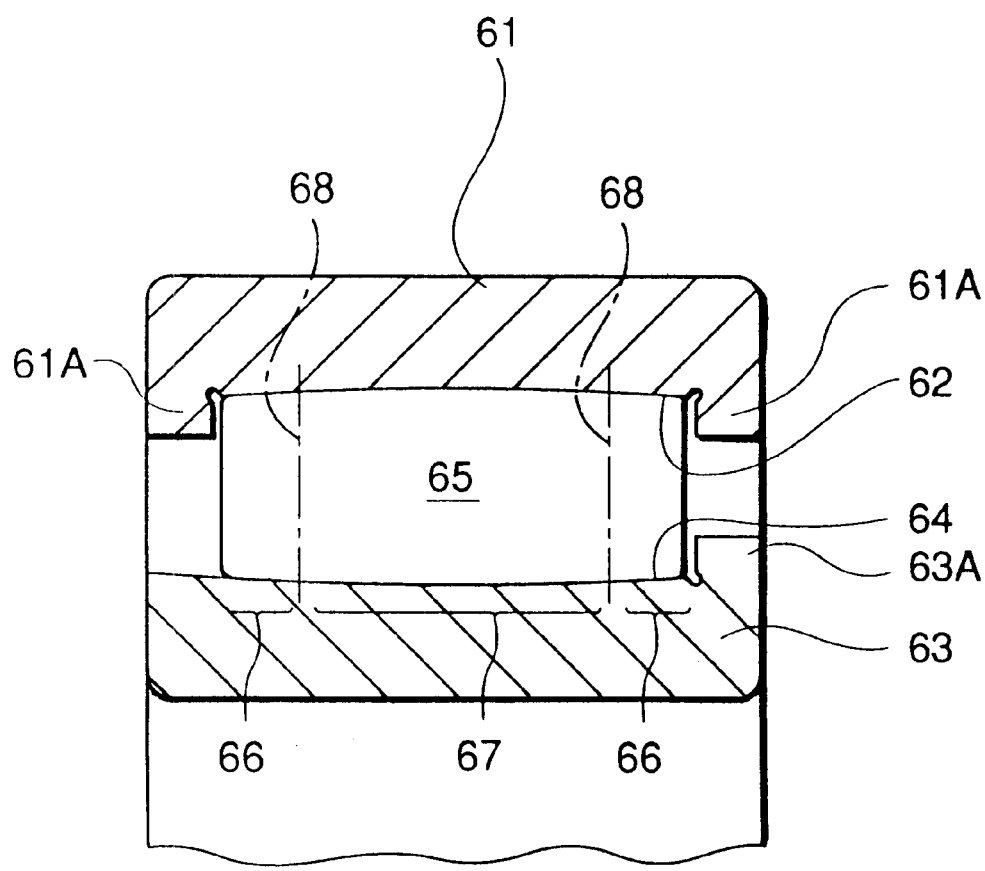
FIG. 6 is a section view of the main portions of a sixth embodiment of a roller bearing according to the invention.

As shown in FIG. 6, a roller bearing 60, which is a sixth embodiment of the invention, comprises a plurality of substantially barrel-shaped rollers 65 which are respectively interposed between a concave-shaped race surface 62, which is formed between a pair of ribs 61A and 61A respectively disposed in an outer race 61, and a concave-shaped race surface 64 which adjoins a rib 63A disposed on one end side of an inner race 63. Each of the rollers 65 is structured such that the central portion of the rolling surface thereof is formed by a first convex-shaped bus 67, while the two end portions of the rolling surface thereof are respectively formed by second convex-shaped buses 66 and 66.

Referring in more particular to the structure of the roller 65, the radius of curvature of the first bus 67 is so set as to correspond to the radii of curvature of the buses of the concave-shaped race surfaces 62 and 64, that is, the former is set very slightly smaller than the latter, and the radii of curvature of the second buses 66 and 66 are respectively set slightly smaller than the radius of curvature of the first bus 67; and, the first bus 67 and the second buses 66, 66 have a common tangent in their respective boundary portions 68.

Of course, according to the present roller bearing 60 as well, there can be obtained a desired effect.

Figure 7:
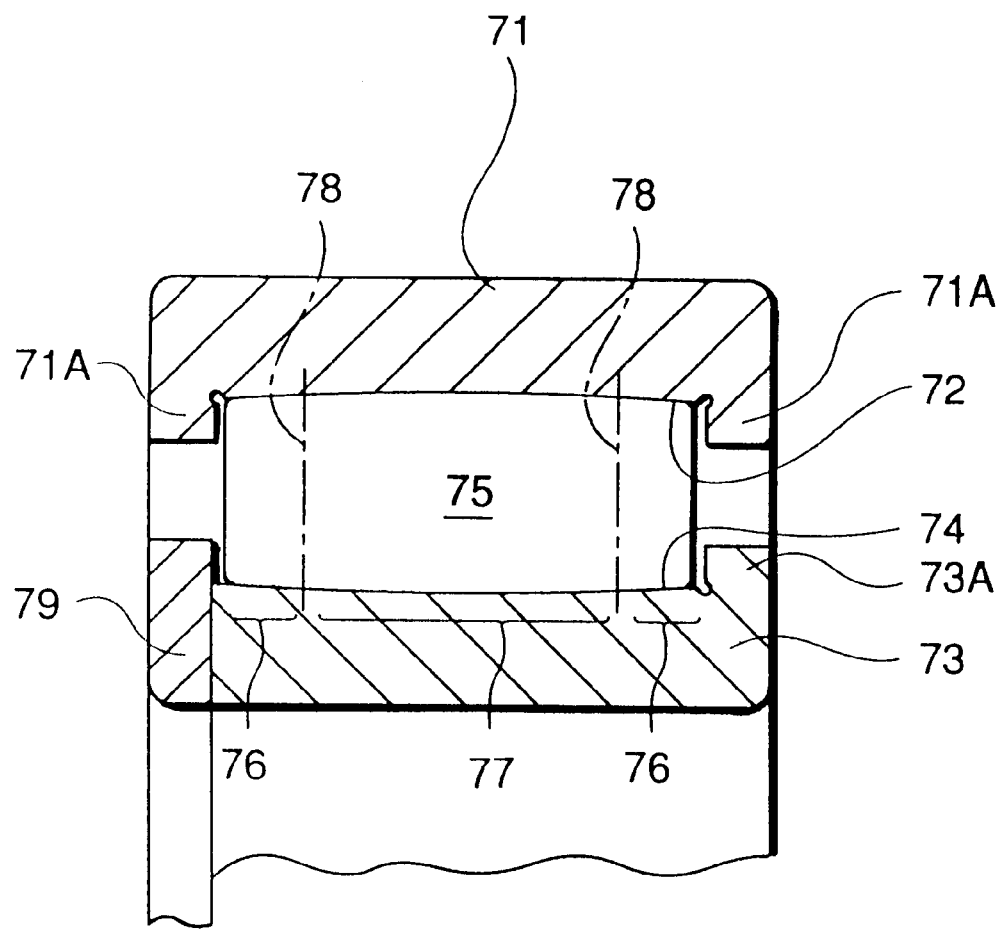
FIG. 7 is a section view of the main portions of a seventh embodiment of a roller bearing according to the invention.

As shown in FIG. 7, a roller bearing 70, which is a seventh embodiment of the invention, comprises a plurality of substantially barrel-shaped rollers 75 which are respectively interposed between a concave-shaped race surface 72, which is formed between a pair of ribs 71A and 71A respectively disposed in an outer race 71, and a concave-shaped race surface 74 which adjoins a rib 73A disposed on one end side of an inner race 73. Each of the rollers 75 is structured such that the central portion of the rolling surface thereof is formed by a first convex-shaped bus 77, while the two end portions of the rolling surface thereof are respectively formed by second convex-shaped buses 76 and 76.

Referring in more particular to the structure of the roller 75, the radius of curvature of the first bus 77 is so set as to correspond to the radii of curvature of the buses of the concave-shaped race surfaces 72 and 74, that is, the former is set very slightly smaller than the latter, and the radii of curvature of the second buses 76 and 76 are respectively set slightly smaller than the radius of curvature of the first bus 77; and, the first bus 7 and the second buses 76, 76 have a common tangent in their respective boundary portions 78.

Of course, according to the present roller bearing 70 as well, there can be obtained a desired effect.

Figure 8:
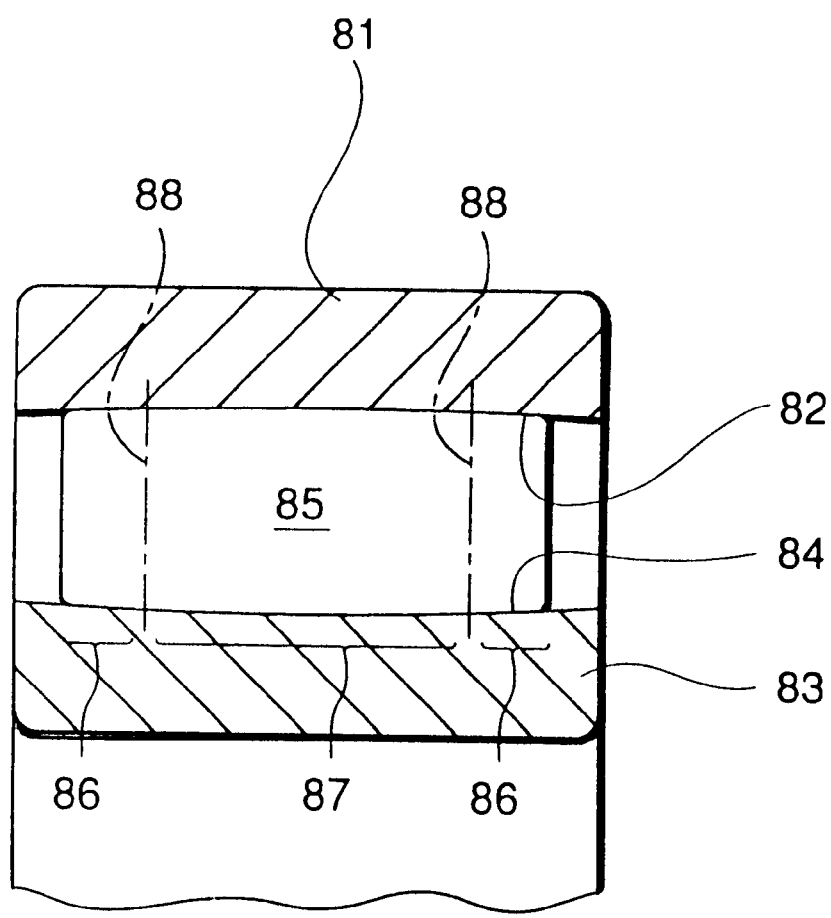
FIG. 8 is a section view of the main portions of an eighth embodiment of a roller bearing according to the invention.

As shown in FIG. 8, a roller bearing 80, which is an eighth embodiment of the invention, comprises a plurality of substantially barrel-shaped rollers 85 which are respectively interposed between a concave-shaped race surface 82 formed on an outer race 81 and a concave-shaped race surface 84 formed on an outer race 83. Each of the rollers 85 is structured such that the central portion of the rolling surface thereof is formed by a first convex-shaped bus 87 and the two end portions of the rolling surface thereof are respectively formed by second convex-shaped buses 86 and 86.

Referring in more particular to the structure of the roller 85, the radius of curvature of the first bus 87 is so set as to correspond to the radii of curvature of the buses of the concave-shaped race surfaces 82 and 84, that is, the former is set very slightly smaller than the latter, and the radii of curvature of the second buses 86 and 86 are respectively set slightly smaller than the radius of curvature of the first bus 87. And, the roller 85 is also structured such that the first bus 87 and second buses 86, 86 have a common tangent line in the boundary portion 88 between them.

Of course, according to the present roller bearing 80 as well, there can be obtained a desired effect.

Figure 9:
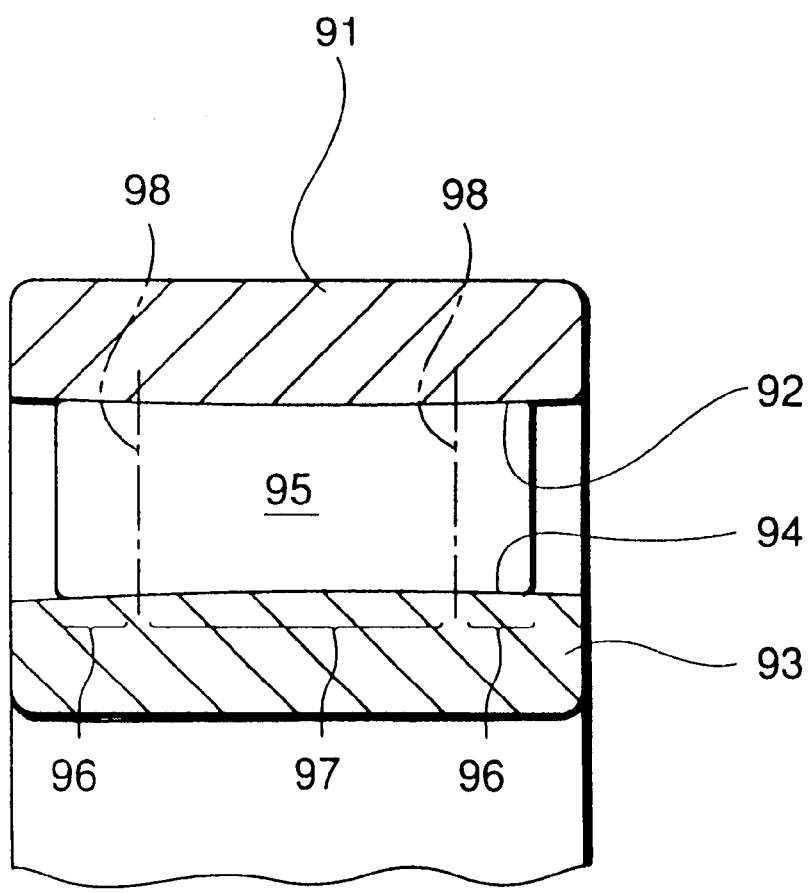
FIG. 9 is a section view of the main portions of a ninth embodiment of a roller bearing according to the invention.

As shown in FIG. 9, a roller bearing 90, which is a ninth embodiment of the invention, comprises a plurality of substantially cylindrical-shaped rollers 95 which are respectively interposed between a convex-shaped race surface 92 of an outer race 91, and a convex-shaped race surface 94 of an inner race 93.

Each of the rollers 95 is structured such that the central portion of the rolling surface thereof is formed by a first concave-shaped bus 97, while the two end portions of the rolling surface thereof are respectively formed by second concave-shaped buses 96 and 96. More particularly, in the present roller 95, the radius of curvature of the first bus 97 is so set as to correspond to the radii of curvature of the buses of the convex-shaped race surfaces 92 and 94, that is, the former is set very slightly smaller than the latter. Also, the radii of curvature of the second buses 96 and 96 are respectively set slightly smaller than the radius of curvature of the first bus 97; and, the first bus 97 and the second buses 96, 96 have a common tangent in their respective boundary portions 98.

In addition to this, in this embodiment, a center of curvature of the convex-shaped race surface 94 of an inner race 93 is positioned at a position further than the axis of the roller bearing, so that the edge load can be remarkably and effectively suppressed.

Of course, according to the present roller bearing 90 as well, there can be obtained a similar effect to the above-mentioned roller bearing 80.

Although aforementioned explanations are given to the rolling surface of the roller which is formed by a plurality of buses containing the first and second buses, an explanation regarding another embodiments in which at least one of the race surfaces of the outer and inner races comprises a plurality of buses containing the first and second buses will be hereinafter described.

Figure 10:
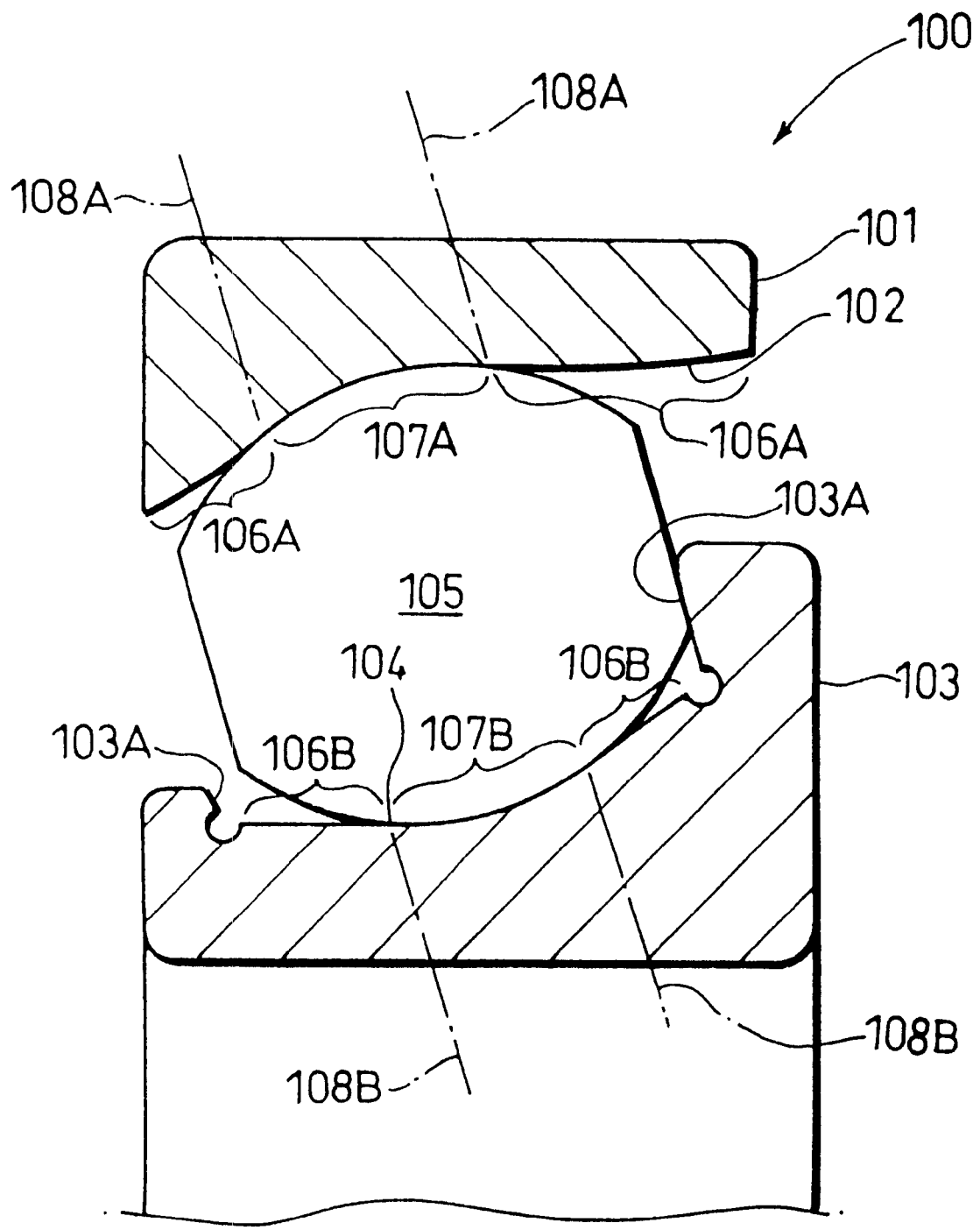
FIG. 10 is a section view of the main portions of a tenth embodiment of a roller bearing according to the invention.

As shown in FIG. 10, a roller bearing 100, which is a tenth embodiment of the invention, comprises a plurality of substantially barrel-shaped rollers 105 which are respectively interposed between a convex and concave mixture shaped race surface 102 of an outer race 101, and a concave-shaped race surface 104, which is formed between a pair of ribs 103A and 103A of an inner race 103.

The convex and concave mixture shaped race surface 102 is structured such that the central portion of the rolling surface thereof is formed by a first concave-shaped bus 107A, while the two end portions are respectively formed by second concave-shaped buses 106A and 106A.

More particularly, the radius of curvature of the first bus 107A is so set as to substantially correspond to the radii of curvature of the buses of the rolling surface of the roller 105, that is, the former is set very slightly larger than the latter. Also, the radii of curvature of the second buses 106A and 106A are respectively set slightly larger than the radius of curvature of the first bus 107A; and, the first bus 107A and the second buses 106A and 106A have a common tangent in their respective boundary portions 108A.

However, note that the radii of curvature of the second buses 106A and 106A can be modified not only to be much larger than the radius of curvature of the first bus 107A but also to be slightly smaller than the radius of curvature of the first bus 107A, if a convex shape of its race surface is kept maintained.

The concave-shaped race surface 104 is structured such that the central portion of the rolling surface thereof is formed by a first concave-shaped bus 107B, while the two end portions are respectively formed by second concave-shaped buses 106B and 106B. The radius of curvature of the first bus 107B is so set as to substantially correspond to the radii of curvature of the buses of the rolling surface of the roller 105, that is, the former is set very slightly larger than the latter. Also, the radii of curvature of the second buses 106B and 106B are respectively set slightly larger than the radius of curvature of the first bus 107A; and, the first bus 107B and the second buses 106B, 106B have a common tangent in their respective boundary portions 108B.

On the other hand, the concave-shape race surface 104 of the inner race 103 in the embodiment can be modified to be a convex and concave mixture shape as well as the race surface 102 of the outer race 101.

Of course, according to the present roller bearing 100 as well, there can be obtained a similar effect to the above-mentioned roller bearing.

Figure 11:
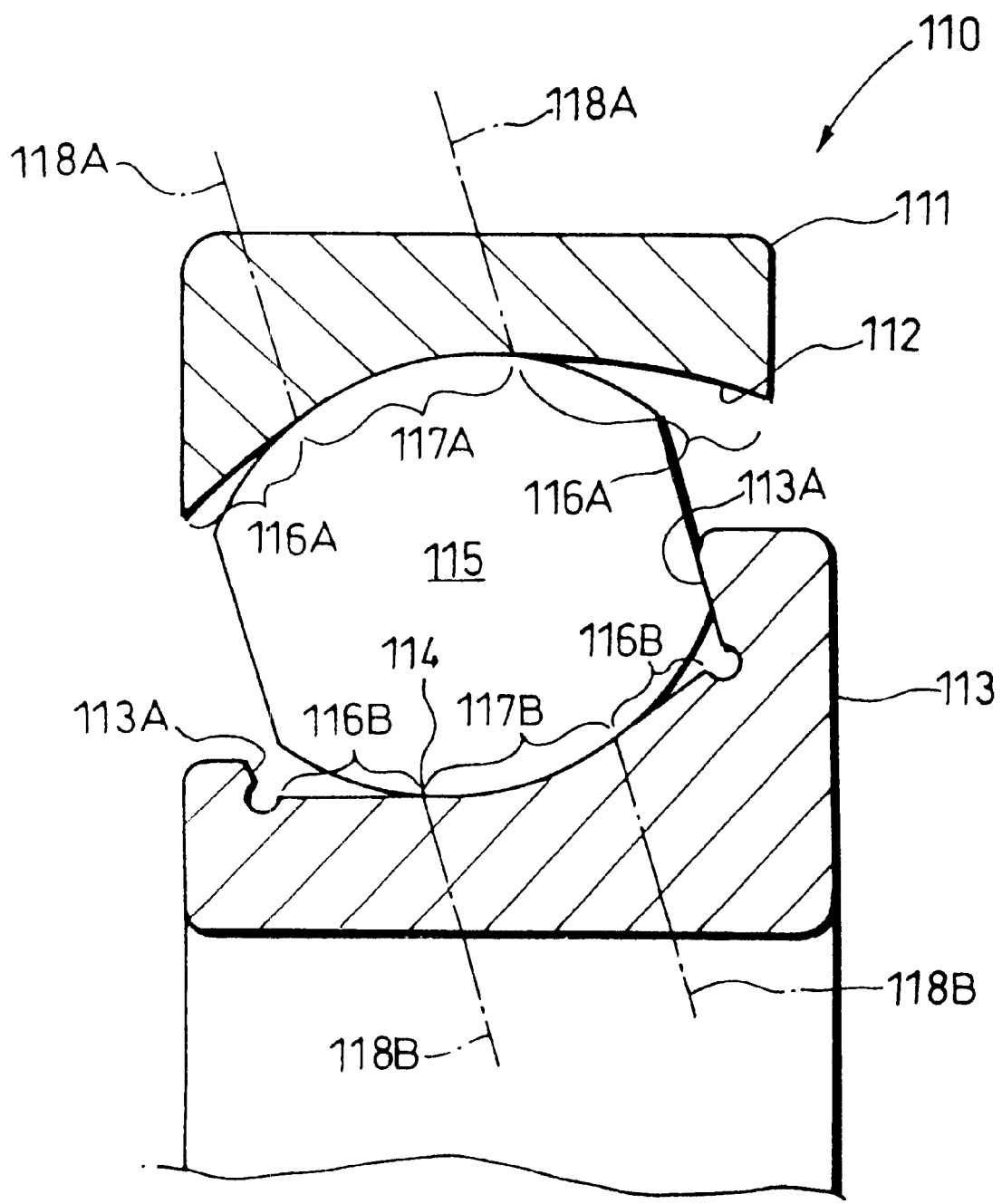
FIG. 11 is a section view of the main portions of a eleventh embodiment of a roller bearing according to the invention.

As shown in FIG. 11, a roller bearing 110, which is a eleventh embodiment of the invention, comprises a plurality of substantially barrel-shaped rollers 115 which are respectively interposed between a concave-shaped race surface 112 of an outer race 111, and a concave-shaped race surface 114, which is formed between a pair of ribs 113A and 113A of an inner race 113.

The concave-shaped race surface 112 is structured such that the central portion of the rolling surface thereof is formed by a first concave-shaped bus 117A, while the two end portions are respectively formed by second concave-shaped buses 116A and 116A. In addition, the concave-shaped race surface 114 is structured such that the central portion of the rolling surface thereof is formed by a first concave-shaped bus 117B, while the two end portions are respectively formed by second concave-shaped buses 116B and 116B.

More particularly, the radius of curvature of the first buses 117A and 117B are set as to substantially correspond to the radii of curvature of the buses of the rolling surface of the roller 115, that is, the formers are set very slightly larger than the latter. Also, the radii of curvature of the second buses 116A, 116A, 116B and 116B are respectively set slightly larger than the radius of curvature of the first buses 117A and 117B; and, the first buses 117A and 117B and the second buses 116A, 116A, 116B and 116B have a common tangent in their respective boundary portions 118A and 118B.

On the other hand, the concave-shape race surface 114 of the inner race 113 in the embodiment can be modified to be a convex and concave mixture shape as well as the race surface 102 of the outer race 101 in the tenth embodiment.

Of course, according to the present roller bearing 110 as well, there can be obtained a similar effect to the above-mentioned roller bearing.

Note that, in the first to ninth embodiment, it is possible to modify it so as to form its race surface of the inner and/or outer race with a plurality of buses, instead of the rolling surface of the rolling member.

Of course, according to the present roller bearing 110 as well, there can be obtained a similar effect to the above-mentioned roller bearing.

Next, as the present inventors have analyzed and studied a typical example of the roller bearings constructed in accordance with the invention as to the presence or absence of an edge load to be produced between the outer and inner races thereof at every axis shift angle, description will be given below of the analysis results thereof together with the analysis results of the conventional roller bearings, that is, comparison examples with reference to Table 1.

TABLE 1

| Axis shift (Unit; Minute) | 0 | 3 | 6 | 9 | 12 |
|---|---|---|---|---|---|
| Embodiment 1 | ○ | ○ | ○ | ○ | ○ |
| Comparison Example 1 | ○ | X | X | X | X |
| Comparison Example 2 | ○ | ○ | ○ | ○ | ○ |

That is, in our test, in all of the embodiment 1 and comparison examples 1 and 2, the outside diameter of an outer race was set for 310 mm, the inside diameter of an inner race was set for 200 mm, the thicknesses of the outer and inner races were both set for 66 mm, and there was employed a roller having an axial length of 49 mm. And, under the conditions that a radial load is 85 kN and an axial load is 42 kN, the inventors analyzed whether any edge load could occur or not at every axis shift angle, and evaluated the results using marks ○ and X.

Here, the embodiment 1 is basically structured in accordance with the above-mentioned first embodiment of the invention; in particular, the radii of curvature of the respective concave-shaped race surfaces thereof were set for 500 mm, the radius of curvature of the first bus of each roller was set for 490 mm, and the radius of curvature of the second bus of each roller was set for 425 mm.

On the other hand, in the comparison example 1, the radii of curvature of the buses of the respective race surfaces thereof were set for 500 mm, the rolling surface of each roller was formed by a single bus, and the radius of curvature thereof was set for 490 mm.

Also, in the comparison example 2, the radii of curvature of the buses of the respective race surfaces thereof were set for 500 mm, the rolling surface of each roller was formed by a single bus, and the radius of curvature thereof was set for 450 mm.

According to Table 1, in the embodiment 1, it is found that, although the radius of curvature of the second bus of the roller is set smaller than the radius of curvature of the first bus thereof and thus the axes of the outer and inner races can be shifted from each other and the roller can be thereby inclined, because the end portions of the rolling surface of the roller are not contacted with the race surfaces of the outer and inner races, the maximum allowed angle of the axis shift is large. In the comparison example 2 as well, because the radius of curvature of the rolling surface of the roller is small, similarly to the embodiment 1, the maximum allowed angle of the axis shift is large.

Figure 12:
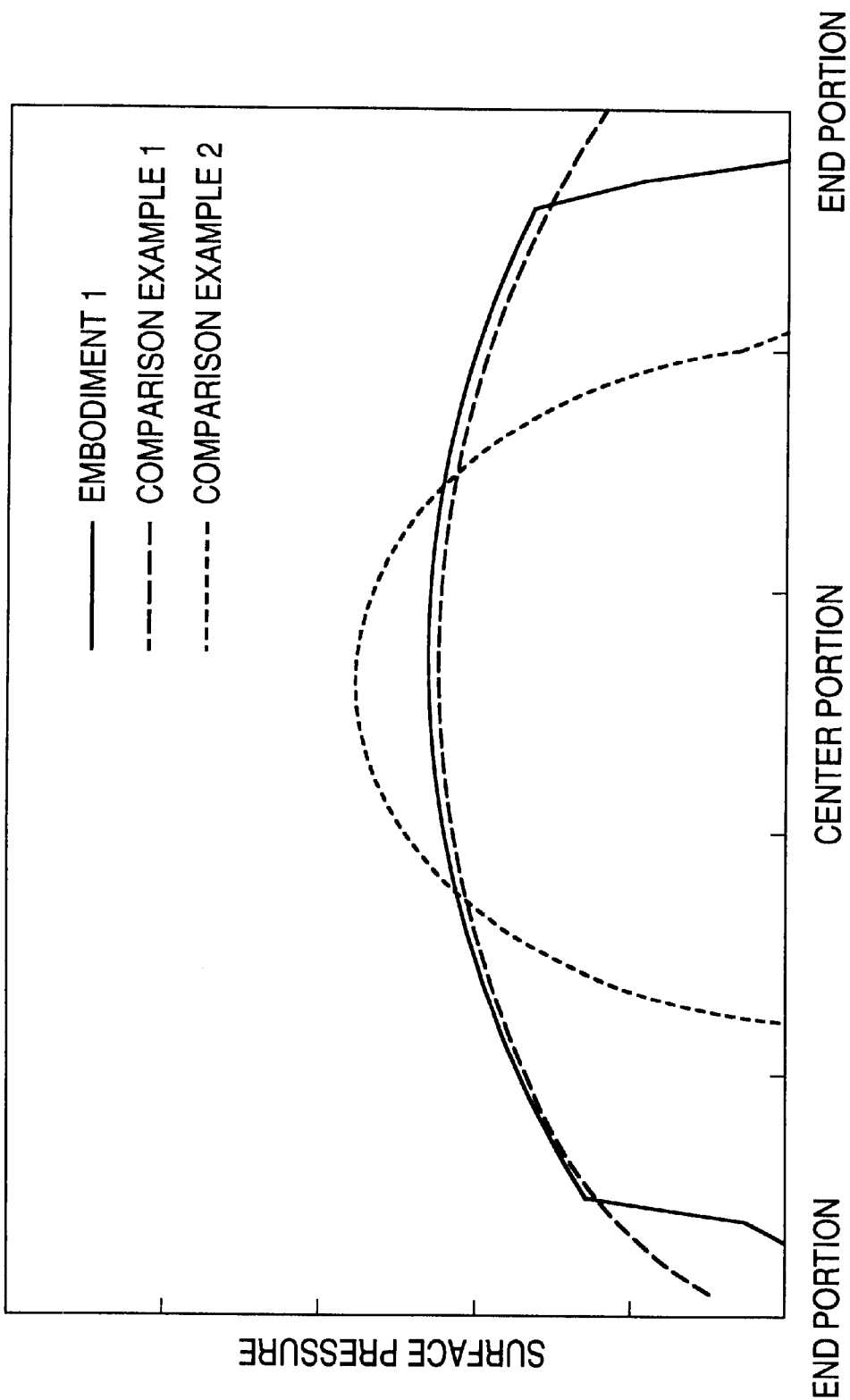
FIG. 12 is a graphical representation of surface pressure distributions respectively obtained in an embodiment of a roller bearing according to the invention and in two kinds of conventional roller bearings, or, comparison examples.
Figure 13:
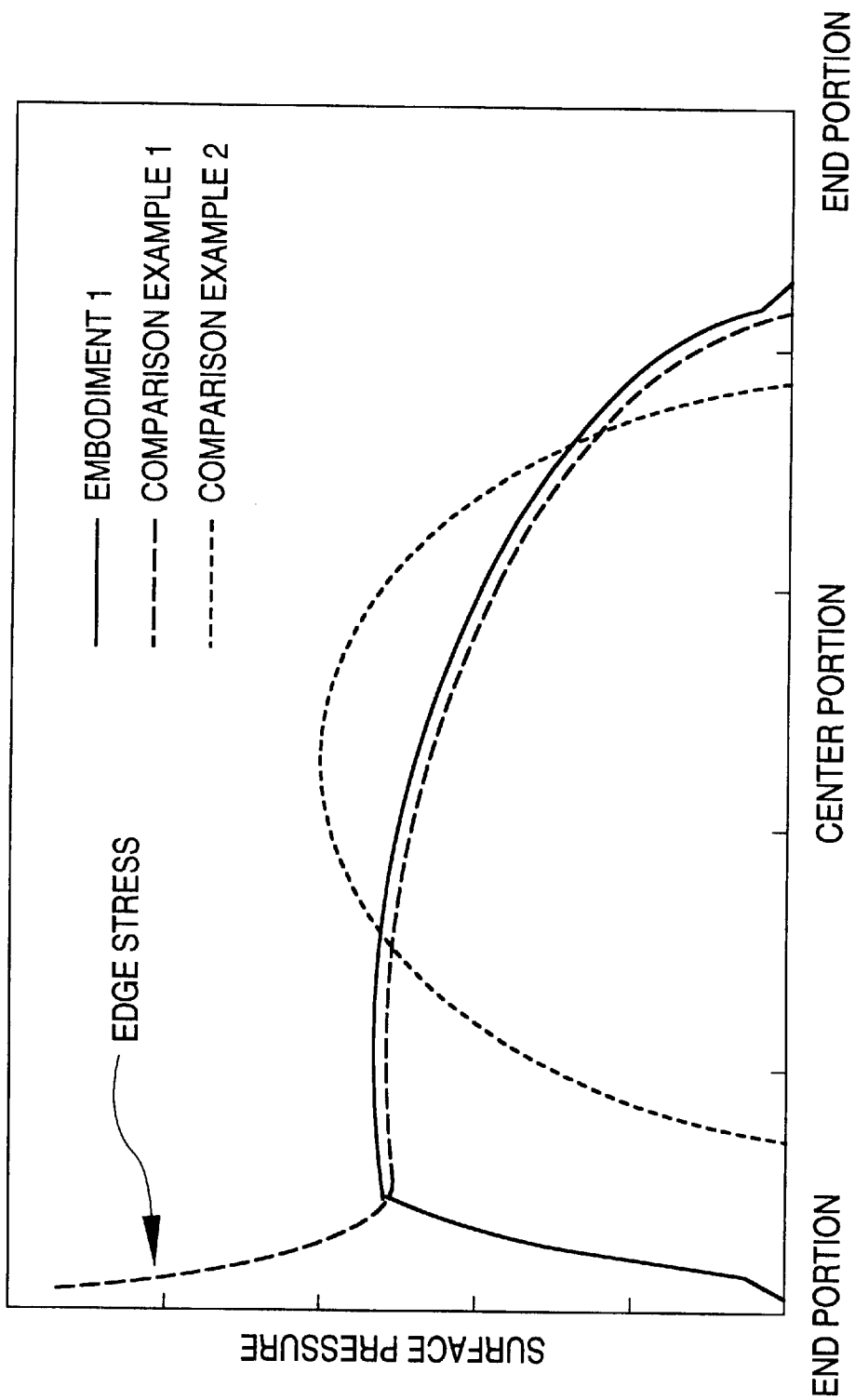
FIG. 13 is a graphical representation of surface pressure distributions respectively obtained in the embodiment of a roller bearing according to the invention and in the two comparison examples shown in FIG. 12.
Figure 14:
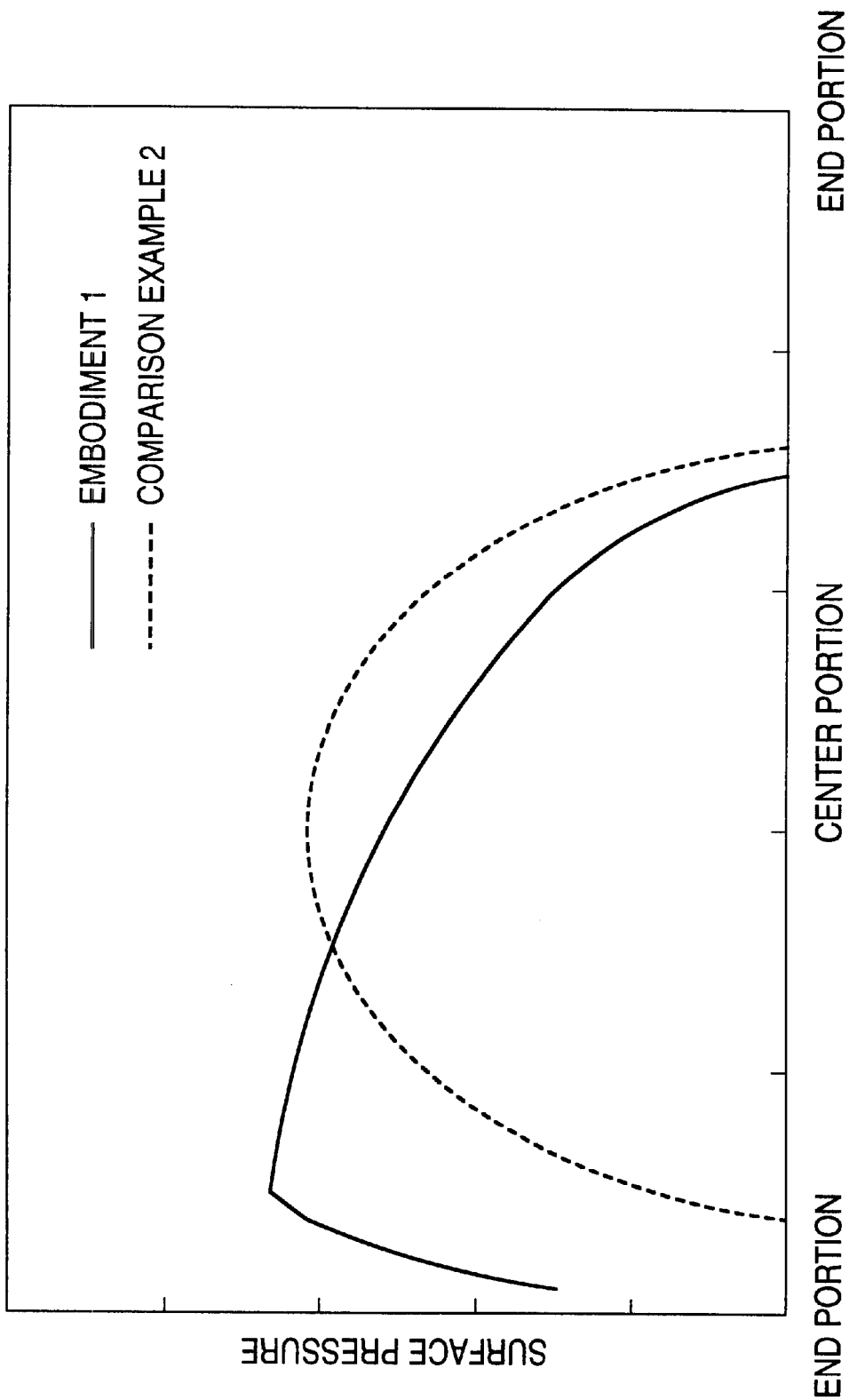
FIG. 14 is a graphical representation of surface pressure distributions respectively obtained in the embodiment of a roller bearing according to the invention and in one of the two comparison examples shown in FIG. 12.

Here, FIGS. 12 to 14 show the axial-direction surface pressure distribution of the roller with respect to the concave-shaped race surface on the inner race side in the embodiment 1 as well as in the comparison examples 1 and 2. In particular, FIG. 12 shows the surface pressure distribution when the axes of the inner and outer races are not shifted at all; FIG. 13 shows the surface pressure distribution when the axis shift between the axes of the inner and outer races is 6 minutes; and FIG. 14 shows the surface pressure distribution when the axis shift between the axes of the inner and outer races is 12 minutes.

In the comparison example 1, when the axes of the inner and outer races are not shifted at all, the surface pressure is the lowest; but, when the axes of the inner and outer races are shifted from each other, there occurs an edge stress. And, in the comparison example 2, because the radius of curvature of the rolling surface of the roller is small, even if the axis shift between the axes of the inner and outer races is large, no edge stress occurs; but, when the axes of the inner and outer races are not shifted at all, or when the axis shift between the axes of the inner and outer races is small, in the central portion of the roller, the surface pressure rises in a quadratic curve manner and thus the surface pressure in the central portion of the roller is larger than the other two examples. Also, from these figures, it can be found that, in the embodiment 1, when the axes of the inner and outer races are not shifted at all, the surface pressure thereof is almost the same as the comparison example 1 and is lower than in the comparison example 2; and, even when the axes are shifted from each other, no edge stress occurs.

From the above-mentioned results, when use in various inclination conditions is taken into account, the embodiment 1 is found best.

By the way, a roller bearing according to the invention is not limited to the respective embodiments described hereinbefore but the material, shapes, dimensions, radii of curvature, number, setting positions and the like of the concave-shaped race surfaces, outer race, inner race, rolling members, convex-shaped buses, convex-shaped race surfaces, concave-shaped buses and the like can be selected arbitrarily, provided that they are able to achieve the present invention.

The present invention is based on Japanese Patent Application No. Hei. 10-183429, which is incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As has been described heretofore, according to the invention, the present roller bearing is structured such that not only the race surfaces of the inner and outer races and the rolling surfaces of the rollers are contacted with each other in the form of mutual contact between the convex-shaped buses and their corresponding concave-shaped buses, but also there are produced relatively large clearances between the race surfaces of the inner and outer races and the respective two-end portions of the rolling surfaces of the rollers. Thanks to this, even when the axis shift angle between the outer and inner races is small, or even when no shift is present between the axes of the outer and inner races is small, the present roller bearing can relieve the surface pressures between the respective race surfaces and the respective rolling members, can control occurrence of an edge load, and can cope with a large axis shift between the inner and outer races when compared with the conventional roller bearing.

What is claimed is:

1. A roller bearing comprising:
    an outer race including a convex-shaped outer race surface which is formed on the inner peripheral surface thereof and is defined by rotating an outer race surface defining bus about an axis thereof;
    an inner race including convex-shaped inner race surface which is formed on the outer peripheral surface thereof and is defined by rotating an inner race surface defining bus about the axis; and
    a plurality of rolling members respectively interposed between said outer and inner race surfaces, an outer peripheral surface of each of said rolling members being defined by rotating a rolling surface defining bus about its axis;
    wherein said outer race surface defining bus and said inner race surface defining bus comprises a first radius of curvature, and
    said rolling surface defining bus comprises:
        a first bus having a second radius of curvature which is different from the first radius of curvature and substantially disposed at a center in an axial direction of the roller bearing; and
        second buses disposed on both sides of the first bus, each of the second buses having a third radius of curvature which is different from the first radius of curvature and is also different from said second radius of curvature,
    wherein at least one of said second buses is directly and continuously connected to said first bus and has a common tangent line in a boundary position therebetween, and
    wherein said first radius is smaller than said second radius, and said second radius is smaller than said third radius.

2. A roller bearing comprising:
    an outer race including an outer race surface which is formed on the inner peripheral surface thereof and is defined by rotating an outer race surface defining bus about an axis thereof;
    an inner race including an inner race surface which is formed on the outer peripheral surface thereof and is defined by rotating an inner race surface defining bus about the axis; and
    a plurality of rolling members respectively interposed between said outer and inner race surfaces, an outer peripheral surface of each of said rolling members being defined by rotating a rolling surface defining bus about its axis;
    wherein said rolling surface defining bus comprises a first radius of curvature, and said outer race surface defining bus and said inner race surface defining bus comprises:
        a first bus having a second radius of curvature which is different from the first radius of curvature and substantially disposed at a center in an axial direction of the roller bearing; and
        second buses disposed on both sides of the first bus, each of the second buses having a third radius of curvature which is different from the first radius of curvature and is also different from said second radius of curvature,
    wherein at least one of said second buses is directly and continuously connected to said first bus and has a common tangent line in a boundary position therebetween.

3. A roller bearing comprising:
    an outer race including a concave-shaped outer race surface which is formed on the inner peripheral surface thereof and is defined by rotating an outer race surface defining bus about an axis thereof;
    an inner race including a concave-shaped inner race surface which is formed on the outer peripheral surface thereof and is defined by rotating an inner race surface defining bus about the axis; and
    a plurality of rolling members respectively interposed between said outer and inner race surfaces, an outer peripheral surface of each of said rolling members being defined by rotating a rolling surface defining bus about its axis;
    wherein said rolling surface defining bus comprises a first radius of curvature, and said outer race surface defining bus and said inner race surface defining bus comprises:
        a first bus having a second radius of curvature which is different from the first radius of curvature and substantially disposed at a center in an axial direction of the roller bearing; and
        second buses disposed on both sides of the first bus, each of the second buses having a third radius of curvature which is different from the first radius of curvature and is also different from said second radius of curvature,
    wherein at least one of said second buses is directly and continuously connected to said first bus and has a common tangent line in a boundary position therebetween, and
    wherein said first radius is smaller than said second radius, and said second radius is smaller than said third radius.

4. A roller bearing comprising:
    an outer race including a convex-shaped race surface formed on the inner peripheral surface thereof;
    an inner race including a convex-shaped race surface formed on the outer peripheral surface thereof; and
    a plurality of substantially cylindrical-shaped rolling members respectively interposed between said convex-shaped race surfaces of said outer and inner races, the outer peripheral surface of each of said rolling members being formed by a concave-shaped bus,
    wherein each of central portions in either said convex-shaped race surfaces of said outer and inner races or said outer peripheral surfaces of said rolling members is formed by a first bus having a given radius of curvature, and two end portions respectively adjoining said central portion are respectively formed by second buses each having a radius of curvature which causes said two end portions to be separate from the other of said convex-shaped race surfaces of said outer and inner races and said outer peripheral surfaces of said rolling members, and wherein at least one of said second buses is directly and continuously connected to said first bus and has a common tangent line in a boundary position therebetween.

* * * * *